United States Patent [19]

Willem

[11] 4,061,515

[45] Dec. 6, 1977

[54] METHOD OF MANUFACTURING SUSPENSION INSULATORS FOR ELECTRIC POWER LINES AND DEVICE FOR THE IMPLEMENTATION THEREOF

[75] Inventor: Michel Willem, Vichy, France

[73] Assignee: Ceraver S.A., Paris, France

[21] Appl. No.: 752,840

[22] Filed: Dec. 20, 1976

[30] Foreign Application Priority Data

Oct. 12, 1976 France .................................. 76.30625

[51] Int. Cl.² .............................................. B32B 31/16
[52] U.S. Cl. ..................................... 156/73.6; 264/69;
425/421; 425/424; 425/389; 425/456; 425/500
[58] Field of Search ............... 425/421, 424, 425, 427,
425/428, 429, 456, 389, 500; 264/23, 69;
156/73.6

[56] References Cited

U.S. PATENT DOCUMENTS

| | | | |
|---|---|---|---|
| 1,574,883 | 3/1926 | Harvey | 156/73.6 |
| 1,615,800 | 1/1927 | Eaton | 425/429 |
| 1,699,063 | 1/1929 | Hawley | 264/69 |
| 1,717,996 | 6/1929 | Moore | 264/69 |
| 1,719,989 | 7/1929 | Moore | 156/73.6 |
| 2,010,934 | 8/1935 | Smith | 156/73.6 |
| 3,576,942 | 5/1971 | Caldor | 156/73.6 |

Primary Examiner—Edward G. Whitby
Attorney, Agent, or Firm—Haseltine, Lake & Waters

[57] ABSTRACT

The invention relates to the manufacturing of suspension insulators of the type comprising essentially a body made of a dielectric material, a metallic cap and rod sealed to said body. The method according to the invention is characterized in that during sealing of the rod in the inner cavity of the body and of the cap on the body head, said body rests on a supporting table and undergoes by vibropercussion a vertical vibrating motion superimposed on a tilting motion with a rotating axis of tilt, said supporting table remaining isolated from the vibrations during the whole sealing operation. Application in particular to the manufacturing of heavy insulators for electric power lines.

8 Claims, 1 Drawing Figure

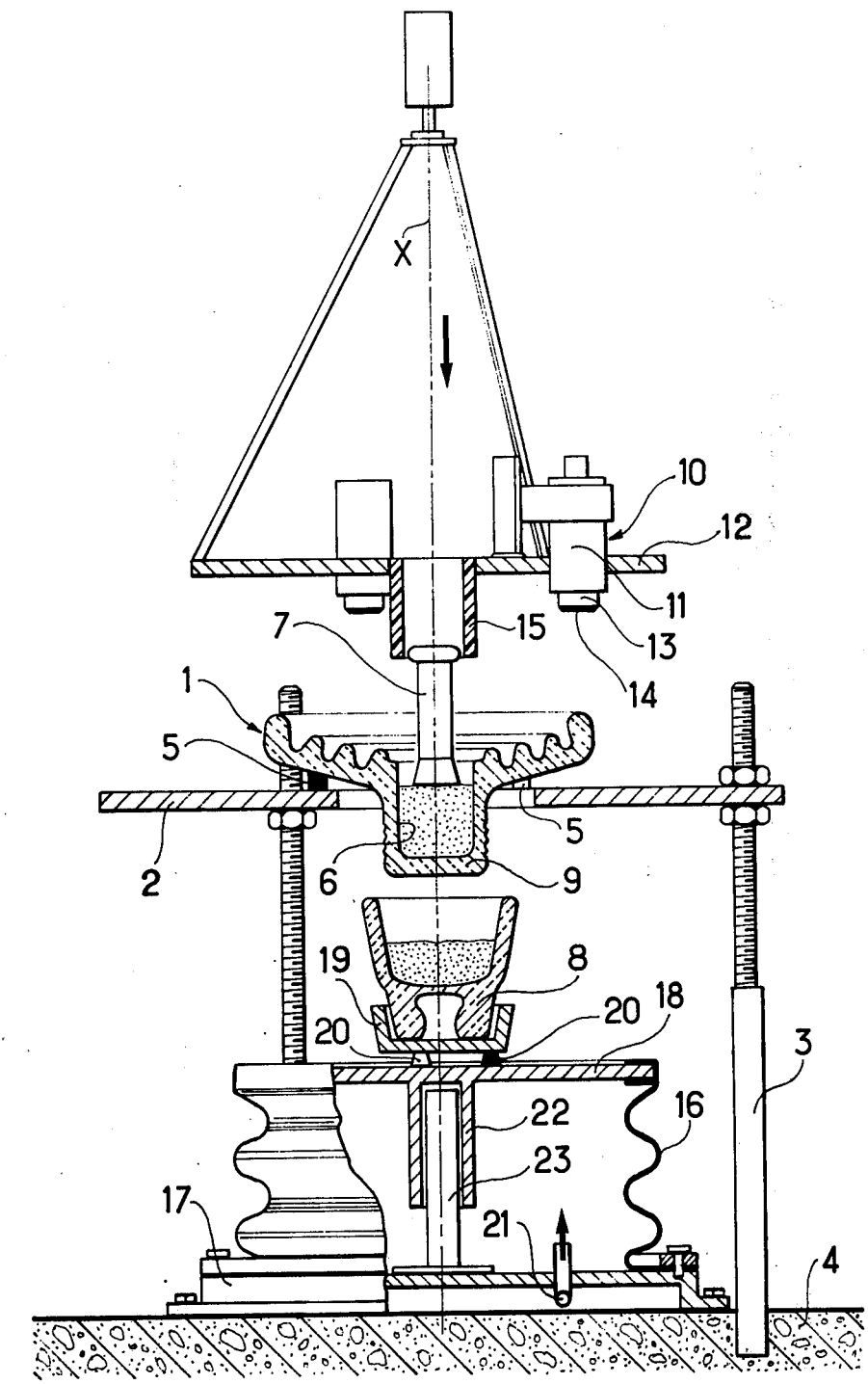

METHOD OF MANUFACTURING SUSPENSION INSULATORS FOR ELECTRIC POWER LINES AND DEVICE FOR THE IMPLEMENTATION THEREOF

The invention relates to the manufacturing of suspension insulators for electric power lines and in particular to a method of manufacturing such insulators and to a device for implementing the method.

These insulators comprise mainly a body made of dielectric material such as porcelaine or glass, on which there are cemented fittings such as a metallic cap and a metallic rod.

The nearest prior art is that described in French Patent no. 1,513,278. According to this prior art, the body of the insulator is fixed directly on a supporting table; the rod and the cap are sealed simultaneously, by vibrating the supporting table and the body of the insulator while the rod in the internal cavity of the body and the cap on the head of said body contain pre-dosed quantities of mortar. The sealing operation is followed by washing, conditioning and final washing operations.

However, this technique which is now well understood still has some limitations: for average weight insulators, i.e., 3 to 8 kg., it is not too cumbersome to make the supporting table vibrate at the same time as the insulator body, for vibrating means which operate at frequencies in the order of 300 cycles per second. But when insulators of the same constitution but heavier in weight, particularly 10 to 15 kg., are manufactured by the methods used in the prior art, the weight of the mass which is to be made to vibrate (insulator and supporting table) soon becomes prohibitive: the vibratory power required is very much greater, and there is also appreciable fatigue of the components of the supporting table and a level of noise which is very unpleasant for the operators.

Preferred embodiments of the present invention provide a method of manufacturing suspension insulators for electric lines and a device for the implementation thereof, enabling manufacture which is better adapted to insulators of about 10 to 15 kg. (this range not being limitative), improving manufacturing economy by reducing the sealing time and avoiding or reducing defects of the prior art, while being of simple design and entailing a moderate investment for mass-production.

In the manufacture of a suspension insulator for an electric power line the invention provides a method of cementing a metallic fitting to a dielectric body by vibratory compacting of a sealing composition between the fitting and the body, the method comprising resiliently mounting the body on a supporting table, placing the sealing composition in a cavity in one of the members to be joined, bringing together the members to be joined with the composition sandwiched between the members, and causing the body to so vibrate by means of vibropercussion that the supporting table remains substantially isolated from vibration while the body executes a vibratory motion including a vertical component superimposed on a tilting component having a rotating axis of tilt such that the body executes a swashplate-like wobble.

Preferably the dielectric body is caused to vibrate at its inherent frequencies, so as to obtain fundamental response frequencies in excess of one kiloherz.

The invention also provides a device for implementing the method of manufacturing suspension insulators for electric lines, comprising a supporting table for the insulator body, a plurality of vibropercutors whose housings are installed on a mobile platform and damping means disposed between the body and the supporting table so that said table remains isolated from the vibrations during the whole sealing operation.

The device according to the invention can also have at least one of the following characteristics:

The device comprises three vibropercutors whose housings are installed at 120° to each other on the mobile platform and which are fed with three-phase AC.

The damping means between the body and the supporting table are constituted by three studs made of rubber or of an elastomer, said studs being disposed at 120° to each other in a circle centred on an axis of symmetry of said body, advantageously in directions staggered by 60° in relation to the axes of the vibropercutors and at a shorter distance from the axis of symmetry of the insulator body so that said body be made to undergo vibrations at its inherent frequencies.

The lower face of the vibropercutors which are to come into contact with the insulator body is fitted with a washer made of a material such as natene or any other semi-rigid elastomer.

The mobile platform has a central tube made of a semi-rigid elastomer ensuring centring of said platform in contact with the dielectric body as well as guiding of a rod fitting during the actual sealing operation.

Other advantages and characteristics of the invention will become more clearly apparent from the following description, given by way of a non-limiting illustration, with reference to the the FIGURE of the accompanying drawing, showing an axial cross-section of a device embodying the invention.

The body 1 of an insulator rests on a supporting table 2 fixed by rods 3 to a bed 4. The body 1 is supported on the supporting table 2 by damping means, which are here rubber or elastomer studs 5, so that said table remains permanently isolated from the vibrations transmitted to the body of the insulator during the sealing phase. Such an assembly of the body 1 on the supporting table 2 is advantageous: not only is the body 1 the only mass to be vibrated, but it is also possible to provide a more elaborate vibration movement to speed up the compaction of the mortar which is necessary for sealing the rod and the cap, so as to reduce the sealing time and hence to increase the economy of manufacture, as described in detail hereinbelow.

As known per se, an internal cavity 6 of the body 1 contains a pre-dosed quantity of compact mortar, e.g. silico-aluminous mortar with a quantity of water substantially equal to that which is necessary for crystallization for sealing a rod 7 which is disposed vertically in its final position. Likewise, a cap 8 contains a pre-dosed quantity of mortar for sealing said cap on a head 9 of the insulator. Here, the general principle used is that set forth in French Patent No. 1,513,278 according to which the body of the dielectric is vibrated, this having the effect of liquefying the rod mortar, thus causing a progressive lowering of the rod 7 into its final position, and also of liquefying the cap mortar while the cap 8 is progressively raised, the head 9 of the insulator acting as a vibrating needle.

There are no other characteristics common to those of the above-mentioned French Patent No. 1,513,278. In the present invention the body 1 of the insulator is subjected to vibroprecussion and undergoes a vertical vibration simultaneously with a tilting swashplate-like wobble in which the axis of the insulator approximately describes a cone, as in nutation of a heavenly body, but without rotation of the body 1 about its axis X, i.e., the axis of tilt rotates but the body 1 does not. For this purpose, the device comprises a plurality of vibropercutors such as 10 whose housings 11 are installed on a mobile platform 12: to make the body 1 of the dielectric vibrate, the platform 12 is lowered until the body 1 comes into contact with the lower face 13 of the vibropercutors, and said vibropercutors are suitably supplied with electricity. The lower face 13 is advantageously fitted with a washer 14 made of a substance such as natene or any semi-rigid elastomer.

As illustrated, an assembly of three vibropercutors is provided whose housings are installed at 120° to each other on the mobile platform 12 and which advantageously is electrically supplied with three-phase AC, so that the dielectric is struck at three times the frequency which would be obtained if the vibropercutors were supplied with electricity in a parallel or a single-phase connection. Such an assembly of vibropercutors makes the body of the dielectric undergo a vertical vibration (in relation to the reference plane of the supporting table) superimposed on the simultaneous swashplate-like vibratory wobble. The wobble obtained substantially increases the compacting speed in relation to the prior art where the vibration movement was only along one axis; the sealing time is thus reduced, which improves production economy.

Here, there are three studs 5 disposed at 120° to each other round a circle having its centre on the axis X of the insulator body. It is advantageous to dispose the studs 5 at 60° in relation to the axes of the vibropercuters and at a shorter distance from the axis of symmetry X of the insulator body 1 (as shown), so that the body 1 is energized with vibrations at inherent frequencies; the frequencies obtained are considerably higher than conventional excitation frequencies which are generally limited to 300 Hz: indeed, it is possible to obtain fundamental response frequencies which can exceed one kiloherz.

The mobile platform 12 has at its centre an opening to receive the rod 7 defining the beginning of a central tube 15 which guides the rod 7 while it is being sealed; it is advantageous for such a tube to be made of a semi-rigid elastomer to ensure centring of the mobile platform 12 in contact with the body 1 as well as guiding the rod, known per se.

Conventional means are provided enabling the cap 8 to be raised to its final position on the head 13 of the body 1. These means are advantageously formed by a non-rigid jack, so as to isolate the cap 8 from the vibrations during the sealing phase. As illustrated, these means can comprise a bellows 16 connected at its lower part to a support plate 17 fixed to the bed and whose upper part is a platform 18 on which a cap support 19 is supported by three elastomer studs 20. An air inlet 21 is provided at the base of the bellows 16 to maintain the pressure and to provide a measure of the vertical position of the cap 8 in relation to the insulator body 1. Due to the flexibility of the jack and of the studs 20, it is possible for the support 19 to incline by a few degrees in relation to a horizontal reference plane, thereby enabling the edge of the cap 8 to be made to press properly against the skirt of the dielectric body 1; this angular tolerance can be adjusted by guiding means within the bellows 16, e.g. by means of a tube 22 sliding along a guide 23 integral with the support plate 17.

The method according to the invention is as follows: once the body 1 is positioned on the studs 5 of the supporting table 2 and the pre-dosed quantities of mortar are disposed in the internal cavity of said body 1 and in the cap 8, the mobile platform 12 is lowered until said body 1 comes into contact with the lower faces 14 of the vibropercutors 10. Suitable energizing of the vibropercutors 10 makes the body 1 undergo a vertical vibration simultaneously with the said swashplate-like wobble vibration: the rod mortar liquefies and said rod 7 is inserted and guided as it is lowered to its final position. Simultaneously, the non-rigid jack is put under pressure and raises the cap 8 to be fitted onto the head 9 of the dielectric body 1. The head 9 has a vibrating stirring action on the cap mortar. The sealing phase lasts about thirty seconds; the electricity supply to the vibropercutors is then cut and the platform 12 is raised. The insulator thus constituted after the rod and the cap have been sealed is released and there is free access thereto in order for it to be taken away by known means such as jaws or vacuum devices towards a subsequent work unit e.g. for a washing phase, before conditioning, final washing and packing after conventional checks.

The method and device embodying the invention have several advantages mentioned hereinabove; in particular, they provide good compacting for sealing the rod 7 which undergoes particularly severe stresses in a chain of suspension insulators and they provide increased strength and reliability and facilitate cleaning operations and considerably simplify any change in model of insulators.

It is self-evident that the invention is in no way limited to the example which have been given thereof by way of illustration, but comprises any embodiment using equivalent means to those in the general definition of the invention as in the claims.

What is claimed is:

1. In the manufacture of a cap and pin type suspension insulator for an electric power line, a method of cementing said cap and said pin to a dielectric body by vibratory compacting of a sealing composition, the method comprising the steps of: resiliently mounting the body on a supporting table, placing the sealing composition in an internal cavity of the body and in the cap, bringing together the members to be joined with the composition sandwiched between the members, and causing the body to so vibrate by means of vibropercussion that the supporting table remains substantially isolated from vibration while the body executes a vibratory motion including a vertical component superimposed on a tilting component having a rotating axis of tilt such that the body executes a swashplate-like wobble.

2. A manufacturing method according to claim 1, wherein the dielectric body is caused to vibrate at its natural resonant frequencies, so as to obtain fundamental response frequencies in excess of one kilohertz.

3. Apparatus for manufacturing cap and pin type suspension insulators for electric power lines by cementing a cap and pin to a dielectric body by vibratory compacting of a sealing composition, comprising: a supporting table for the dielectric body, a plurality of vibropercutors with housings on a mobile platform suspended over said table, and damping means disposed on the supporting table between said table and said body resting thereon so that said table remains isolated from the vibrations of said body.

4. Apparatus according to claim 3, wherein three vibropercutors with housings are located at 120° to each other on the mobile platform, and with three-phase AC for connecting to said vibropercutors.

5. Apparatus according to claim 4, wherein said damping means between said body and said supporting table comprises three studs of rubber and disposed at 120° to each other in a circle centered on an axis of symmetry of said body.

6. Apparatus according to claim 5, wherein said studs are disposed in directions staggered by 60° in relation to the axes of the vibropercutors and at a shorter distance from the axis of symmetry of said insulator body so that said body be made to undergo vibrations at its natural resonant frequencies.

7. Apparatus according to claim 3, wherein a lower face of the vibropercutors which are to come into contact with the insulator body has a washer of a material comprised of semi-rigid elastomer.

8. Apparatus according to claim 3, wherein said mobile platform has a central tube of a semi-rigid elastomer ensuring centering of said platform in contact with said dielectric body as well as guiding of a rod fitting during a sealing operation.

* * * * *